United States Patent [19]

Vakser et al.

[11] 4,385,254

[45] May 24, 1983

[54] ELECTRIC-MACHINE STATOR BAR WINDING

[76] Inventors: Boris D. Vakser, ulitsa Shvernika, 53 kv. 78; Zakhar M. Gurevich, ulitsa Kosmonavtov, 50/4 kv. 43; Anatoly D. Ignatiev, ulitsa Basseinaya, 85, kv. 162; Viktor O. Kogan, ulitsa Varshavskaya, 63, kv. 36; Jury L. Presnov, ulitsa Lensoveta, 73/2 kv. 57; Izrail A. Ptakul, ulitsa Pulkovskaya, 17 kv. 158; Garri M. Khutoretsky, ulitsa Altaiskaya, 20, kv. 5, all of Leningrad, U.S.S.R.

[21] Appl. No.: 267,474

[22] Filed: May 27, 1981

[51] Int. Cl.³ .............................................. H02K 3/46
[52] U.S. Cl. .................................................... 310/260
[58] Field of Search ............................... 310/260, 270; 174/138 E, 138 F

[56] References Cited

U.S. PATENT DOCUMENTS

| | | | |
|---|---|---|---|
| 3,648,091 | 3/1972 | Kostin et al. | 310/260 |
| 3,758,706 | 9/1973 | Strauss et al. | 310/260 X |
| 4,238,339 | 12/1980 | Khutoretsky et al. | 310/260 |
| 4,309,636 | 1/1982 | Pollok | 310/260 |

OTHER PUBLICATIONS

"Turbogeneratoren fur Kernkraftwerke"; Wanke; AEG, und Telefunkentechnische Mitteilungen, Berlin, 1969, No. I.
"Turbogenerators, Calculation and Design", Titov V.V.; Leningrad Energy Publishing House, pp. 209-210.

Primary Examiner—John Gonzales
Attorney, Agent, or Firm—Fleit, Jacobson & Cohn

[57] ABSTRACT

Disclosed is an electric-machine stator bar winding provided with an arrangement for electric insulation of end connections of extreme bars of different phase winding groups, that comprises box-type dielectric screens encompassing said connections. Each of the screens is built up of channel-shaped members made from a thermosetting material and having bent end portions. These members are so installed that adjacent walls of a pair of the screens in one interphase region of the end windings, lying in the radial planes of the stator are formed by adjoining walls of the angle-shaped members, the walls of the screens which are opposite to the adjoining walls are formed by the walls of the channel-shaped members, whereas the walls of the screens, lying in the tangential planes of the stator are formed by the flanges of the channel-shaped and angle-shaped members, the bent end portions of these members adjoining a part of involume sections of the bar end portions. The end windings have members used for tangential fastening of the bar end portions, which members are made from an electrically insulating moulding material, arranged in the interphase regions, and entering the regions of arrangement of the involute sections of the bars.

16 Claims, 5 Drawing Figures

ELECTRIC-MACHINE STATOR BAR WINDING

FIELD OF THE INVENTION

The present invention relates generally to electric machines, and is particularly concerned with bar windings of the stator of an electric machine.

More particularly, the present invention relates to the construction of an arrangement for the electric insulation of the end connections of extreme bars in the electric-machine stator winding, that belong to different phase bar groups of said winding.

Most successfully, the present invention can be used in powerfull and superpowerfull, high-voltage alternating-current generators whose stator windings are provided with water cooling, in particular in turbo-generators and hydro-generators.

BACKGROUND OF THE INVENTION

In electric generators provided with bar stator windings the bars are laid in radial slots of the stator core while their ends extend beyond said slots. In the end stator windings at the stator end faces, bar ends are connected, in accordance with the circuit diagram adopted for the particular generator, one to another by respective jumpers. The end connections of the bars are divided along the stator circumference into several alternating groups belonging to different winding phases, and every such a group comprises several end connections belonging to one winding phase. While a comparatively low potential difference exists between two adjacent bar end connections in one winding phase group during the operation of the generator, this potential difference being determined by the interturn voltage of one winding phase, the full line voltage of the stator winding can be present between adjacent extreme end connections of two neighbouring phase groups. In modern powerfull generators, the line voltage of the stator winding can reach a value of the order of 30 kilovolts. In order to avoid an electric breakdown between extreme end connections, they are, therefore, to be provided with means ensuring a reliable insulation of one such end connection from another. Furthermore, the arrangement used to insulate the end connections should at least not deteriorate the mechanical strength of the winding and, in particular, the end windings that can undergo rather high electrodynamical loads during the operation of the generator. At the same time the electrically insulating arrangement should reliably perform its functions during an adequately long time under various operating conditions of the generator, including its high-voltage testing, high-load operation and short circuits.

Known in the prior art are two basic types of electrically insulating arrangements for end connections of the stator winding bars, namely, the continuous-type arrangement that is a layer incorporating many turns of electrically insulating tape impregnated with respective substances, and thermally treated, and the barrier-type arrangement comprising insulating members of various geometrical shape installed between the end connections to be insulated and being certain types of barriers preventing the breakdown current flow. The use of the continuous-type arrangement complicates the production process of the electric machine and the repair thereof as well as does not allow to design an end winding construction with the desired mechanical stiffness. The barrier-type arrangement are, therefore, used in powerful generators.

There is known in the prior art an electric-machine stator bar winding (cf., for example, the book V. V. Titov et al. "Turbo-generators. Calculation and construction", Leningrad, Publishing House "Energija," 1967, p. 209–210) wherein the end portions of bars projecting from the radial slots of the core have involute and straight-line sections, the latter having end connections. Said winding of the stator has, in the end windings, an arrangement for insulating the end connections of the extreme bars belonging to different phase groups of winding bars or, in short, the extreme end connections that are separated from each other by interphase regions. This arrangement incorporates barriers made as integral box-type screens from an insulating moulded material. The box-type screens are so installed that they encompass the extreme end bar connections and extend along a portion of straightline sections of bar ends, that are connected, the interior of the box-type screens being filled with an insulating compound. In this stator winding, the insulation of extreme end connections is provided primarily by the dielectric strength of the box-type screen walls and the air gap in the interphase regions, wherein the electric field is comparatively little non-uniform.

However, in such a construction, the insulation reliability becomes insufficient in electric machines with a high unit power and an increased rated voltage since, firstly, the material of the box-type members has a comparatively low dielectric strength and is apt to a relatively quick thermal and electrical ageing and, secondly, the box-type screens cover only partially the straight-line sections of the end portions of the bars, that are insulated and very little envelop the basic insulation of the bars. An electrical breakdown of the air gap can, therefore, easily originate in the event of dirtening or moistening of the interphase region for any reasons with the development of flashover of this region when the breakdown current flows over surfaces of the electrically insulating members and the basic insulation of the bars. The probability of the flashover increases still further when dielectric spacer members causing a redistribution of the voltages and a sharp increase in the non-uniformity of the electric field in the interphase regions are introduced between the box-type screens in the interphase regions in order to provide the mechanical stiffness of the end windings. Due to this reason this construction cannot provide an increased stiffness of the end windings without a certain decrease in the reliability of the electrical insulation of the extreme end connections of the winding bars. The inadequate stiffness of the end windings leads to their vibrations generated under the action of variable electrodynamical loads during the operation of the electric machine. The vibrations of the end windings can lead in turn, especially in powerfull electric machines, to breaks in soldered joints of the bar end connections, to an abrasion and crumpling of the insulation at the places of securing of the bar end portions and of their emergence from the core slots and to a fatigue damage to elementary copper conductors of the winding bars. This can cause in turn an emergency and failure of the electric machine.

Also known in the prior art is another electric-machine stator bar winding whose end bar portions have involute and straight-line sections with end connections as well (cf., for example, the article by K. Wanke "Turbogeneratoren für Kernkraftwerke" in the magazine "AEG und Telefunken technische Mitteilungen", Berlin, 1969, No. 1, p. 1–10). This stator winding also comprises, in the end windings, an arrangement for the electric insulation of the end connections of the extreme bars included into different phase groups of winding bars. The insulating arrangement comprises integral dielectric box-type screens having a rectangular cross-section similar through the screen length, and each of the screens encompasses an extreme end bar connection. The box-type screens are installed in pairs in such a manner that they have adjacent walls in each interphase region of the end windings. The box-type screens have such a length that each of them covers completely the connected straight-line sections of bar end portions. An additional dielectric flat screen is installed between each pair of the box-type screens in the central port of the interphase regions. In this winding, the electric insulation of extreme end connections is provided not only by the dielectric strength of walls of the box-type screens and the air gap in the interphase regions, but also by that of the additional flat screen.

However, the use of the insulating arrangement described hereinabove and possessing acceptable insulating properties for extreme end connectons in the known prior art stator winding led to a complication of the construction of the end windings. This complication is expressed in the facts that, firstly, the length of the straight-line sections of the bar end portions is increased in order to reduce the probability of flashover by providing a larger coverage of the basic insulation of these sections by the box-type screens, leading to an increase in the total length of the electric machine and, secondly, the end portions of the bars in each phase group have additional bents towards the electric-machine housing in order to provide larger width of the interphase regions. Furthermore, in this insulating arrangement it is difficult to provide a reliable securing of the additional flat screen, hindering the provision of stiffness of the end windings and, hence, their resistance to vibrations. It is also worth to mention the inconvenient and complicated installation and removal of the box-type screens during the mounting and dismantling of the end windings, when the electric machine is built or repaired. This all complicates the manufacture of the elecric machine with such a bar stator winding and makes it more expensive.

SUMMARY OF THE INVENTION

It is an object of the present invention to increase the reliability of the electric machine.

Another object of the present invention is to improve the reliability of the electric insulation of the end connections of the extreme bars included into different phase bar groups of the electric-machine stator winding.

A further object of the present invention is to improve the high-voltage parameters of the insulating arrangement of end connections of extreme bars in different phase groups of the stator winding, in particular, increasing the voltage of flashover of these connections in the interphase regions of the end windings of the electric-machine stator.

A still further object of the present invention is to improve the resistance of the end windings of the electric-machine stator to vibrations.

With these and other objects in view there is provided an electric-machine stator bar winding wherein the end bar portions have involute and straight-line sections and which is provided, in the end windings, with an arrangement for the electrical insulation of end connections of extreme bars included into different phase bar groups, that comprises box-type dielectric screens encompassing each said end connection and installed in pairs so that in each interphase region of the end windings they have adjacent walls, and with members for the tangential fastening of the bar end portions, made from an electrically insulating moulding material and arranged in the interphase regions of the end windings, wherein, according to the invention, the tangentially fastening members enter the region of arrangement of involute sections of winding bars whereas the box-type dielectric screens are built up of angle-shaped and channel-shaped members made from an electrically insulating, thermosetting material, each having one bent end part, that are installed in such a manner that the adjacent walls of each pair of neighbouring box-type dielectric screens of one interphase region, lying in the radial planes of the stator are formed by adjoining walls of the angle-shaped members, the walls of each pair of neighbouring box-type dielectric screens, lying in the radial planes of the stator, but being opposite to said adjoining walls are formed by the walls of the channel-shaped members, whereas an inner wall and an outer wall of the box-type dielectric screens, lying in the tangential planes of the stator are formed by one flange of the channel-shaped member and a flange of one of the angle-shaped members adjoining each other with an overlap, the bent end parts of the angle-shaped and channel-shaped members extend along the involute sections of the bar end portions and adjoin a part of the surface of these sections.

The fact that the channel-shaped and angle-shaped members used to build up the box-type dielectric screens of the electric insulating arrangement for end connections of winding bars are provided with bent parts adjoining the involute sections of the bar end portions lengthens the path of the current of possible flashover of said connections, thus increasing the voltage required for the flashover origination. The fact that the members used for the tangential fastening of the bar end portions enter the region of involute sections with a result that these members adjoin both the surface of said sections and the surface of the box-type dielectric screens provides an increased stiffness of the end windings of the electric-machine stator.

It is advisable that the total length of overlap of the flanges of the channel-shaped and angle-shaped members, forming the inner or outer walls of each of the box-type dielectric screens and the length of the part of each involute section of the bar, adjoining the bent part of the channel-shaped and angle-shaped members, expressed in millimeters, is numerically equal to at least 2.5 $U_r$ where $U_r$ is the rated voltage of the electric machine, expressed in kilovolts.

It is also advisable that the tangentially fastening members enter the region of the involute sections of the bar end portions to a length equal to 5 to 10 percent of the length of said region.

Furthermore, it is advisable that the channel-shaped and angle-shaped members used to build up the box-type dielectric screens be made from a thermosetting material incorporating mica and having dielectric properties essentially similar to those of the basic insulation of the winding bars.

The manufacture of the members used to build up the box-type dielectric screens from said material possessing increased mechanical end electrical properties ensures a reliable and continuous action of these members.

The channel-shaped and angle-shaped members used to build up the box-type dielectric screens may be manufactured from a Mycalex tape incorporating 26 to 40 percent of mica with the use of epoxidized-novolac binders.

The channel-shaped and angle-shaped members used to build up the box-type dielectric screens may be also manufactured from a Mycalex tape comprising at least 28 percent of mica with the use of epoxidized-polyester compounds as binders.

The electric-machine stator bar winding in accordance with the present invention is also characterized in that the overlapping sections of the flanges of the channel-shaped and angle-shaped members of the box-type dielectric screens are sealed with the use of a means that is a moulding, setting, thermosetting compound.

The sealing of the overlapping sections of the flanges of the channel-shaped and angle-shaped members used to build up the walls of the box-type dielectric screens prevents the flashover current flow over the adjoining surfaces of these flanges.

BRIEF DESCRIPTION OF THE DRAWINGS

Other and further objects and advantages of the invention will be better understood from the following description taken in conjunction with the accompanying drawings illustrating preferred embodiments of the invention, wherein.

It should be noted that the accompanying drawings are given in a schematic form and serve merely to illustrate the present invention without any restriction as to the dimensions of the members incorporated into the proposed electric-winding stator bar winding, the relationships between the sizes of these members, etc. Throughout these figures, like characters refer to like parts.

DETAILED DESCRIPTION OF THE INVENTION

Figure 1:
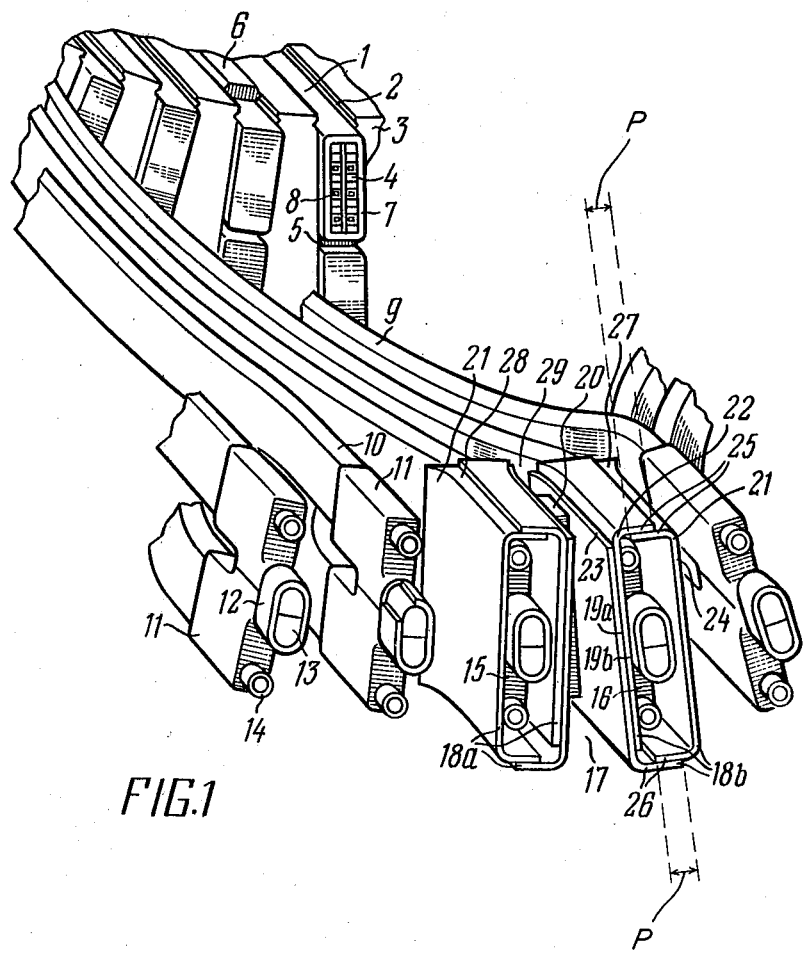
FIG. 1 is a perspective view of a portion of the electric-machine stator bar winding from the side of one of the end windings in accordance with the present invention.

Referring now to the accompanying drawings and initially to FIG. 1, the double-layer bar winding of the stator of an electric machine, for example, a high-voltage alternating-current generator with a power of the order of 500 to 800 megawatts, having a water cooling of this winding comprises bars 1 laid into slots 2 of a core 3 of the stator of this generator. The bars 1 are built up from a plurality of conductors 4 are separated from one another in the slot 2 by means of an insulation spacer 5 and are wedged in said slot by wedges 6. Each of the bars 1 incorporates a plurality of elementary conductors 4 and is insulated with a basic insulation layer 7. A channel 8 is provided inside each bar 1 for circulation of a cooling liquid. The stator bar winding has end windings with only one end winding shown in the drawing, the end winding being formed by end portions of the bars 1 projecting from the slots 2 and incorporating involute sections 9 and straight-line sections 10. The latter have end connections 11, each end connection being formed by clamps 12 encompassing bosses 13 of lugs of the bars 1 and soldered after the assemblying; the lugs of the bars 1 have unions 14 used to connect interconnecting pipes.

The end connections 11 of the bars 1 are divided along the stator circumference into several alternating groups belonging to different winding phases; for the sake of simplicity, the drawing illustrates only a part of one such a group comprising two central end connections 11 belonging to one winding phase and one extreme end connection generally designated with a character 15. Arranged beside the extreme end connection 15 of one phase group of the bars 1 is an extreme end connection 16 of another phase group, these extreme end connections being separated one from the other by a space or an interphase region 17.

The stator bar winding comprises an arrangement for electric insulation of the extreme end connections 15 and 16, incorporating box-type dielectric screens 18, each encompassing one of these connections. The box-type dielectric screens 18 installed around the extreme end connections 15 and 16 belonging to different phase groups of the bars 1 of the winding from a pair of box-type screens 18a and 18b having adjacent walls 19a and 19b, respectively, arranged in the interphase region 17 and lying in the radial planes of the generator stator. Installed between the box-type dielectric screens 18 in the interphase region 17 is a dielectric cleat wedge 20 fixing the positions of these screens in the tangential directions.

Each of the box-type dielectric screens 18 is composite and is formed from members having the shape of angles and channels, namely, from one channel-shaped member 21 and two angle-shaped members 22 and 23. Therewith, each of the adjacent walls 19 of the pair of the box-type screens 18a and 18b is formed by adjoining walls of the angle-shaped members 22 and 23; a wall 24 of each box-type dielectric screen 18, lying in the radial plane of the stator, but being opposite to the adjacent wall 19 is formed by the wall of the channel-shaped member 21, whereas each of inner walls 25 facing inside the core 3 of the stator and of outer walls 26 facing the outer surface of the core 3 of the stator is formed, in these screens, by one flange of the channel-shaped member 21 and a flange of one of the angle-shaped members 22 and 23 adjoining one to the other with a certain overlap having the length "P" (see FIG. 1). The channel-shaped member 21 and the angle-shaped members 22 and 23 forming one box-type dielectric screen 18 are interconnected into an integral assembly by means of thermosetting glue applied to the contacting surfaces of these members.

The overlap length "P" is chosen to be such that the total length 2P of the overlap of the flanges forming the inner walls 25 or the outer walls 26 of each of the box-type dielectric screens 18, expressed in millimeters, is equal numerically at least 2.5 $U_r$ where $U_r$ is the rated voltage of the electric machine, expressed in kilovolts. So, for example, if the rated voltage of a generator is 25 kilovolts, then the overlap length "P" on one inner wall 25 or one outer wall 26 should be at least (2.5×25)=62.50 millimeters. Such a value of the overlap is completely sufficient, in most cases, to prevent the flashover of the end connections 15 and 16 with the flow of the flashover current over the contacting surfaces of the flanges forming the walls 25 and 26 of the box-type dielectric screens 18. In order to prevent such a flashover more reliably, the contacting sections of said flanges are sealed with a means 28 that is a layer of putty made from a moulding thermosetting compound applied to external surface of the box-type dielectric screens 18 along the edge of the angle-shaped member 22 on the wall 25 and the angle-shaped member 23 on the wall 26 of said screens.

Figure 2:
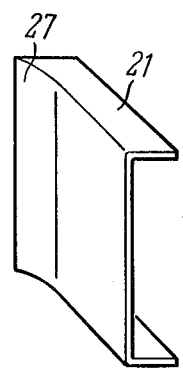
FIG. 2 is a perspective view of a channel-shaped member of one of the box-type dielectric screens.
Figure 3:
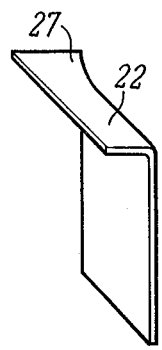
FIG. 3 is a perspective view of an angle-shaped member of one of the box-type dielectric screens.
Figure 4:
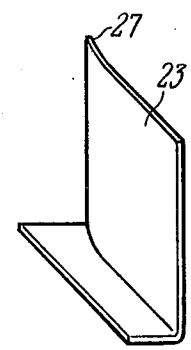
FIG. 4 is a perspective view of another angle-shaped member of one of the box-type dielectric screens.

One end of the channel-shaped member 21 and the angle-shaped members 22 and 23 is bent in each box-type dielectric screen 18. The shape of these members may be most clearly understood from FIG. 2, FIG. 3 and FIG. 4 that illustrate respectively the channel-shaped member 21, the angle-shaped member 22 and the angle-shaped member 23 forming the left-hand (as seen on the drawing) box-type screen 18a (FIG. 1) and having bent end parts 27 (FIGS. 2, 3, 4). The members 21, 22 and 23 forming the right-hand (as seen on the drawing) box-type screen 18b (FIG. 1) are bent at the same end in such a manner that their bent parts 27 are mirror reflections of the bent parts 27 of the members forming the box-type screen 18a. Owing to such a shape of the members 21, 22 and 23, the box-type dielectric screens 18 have, at one of their ends, a funnel facing the involute sections 9 of the end portions of the bars 1 by its wider portion. The positions of the members 21, 22 and 23 forming the box-type dielectric screens 18 with respect to each other and the relationships of geometrical dimensions of these members and the dimensions of the end connections 15 and 16 and the diameter of the insulation layer 7 of the end portions of the bars 1 are selected in such a manner that a certain gap that can be filled with an insulating compound exists between the inner surfaces of the walls 19 and 24 of the box-type dielectric screens 18 and the clamp 12 for these connections, and the bent parts 27 of these members extend along the involute sections 9 and adjoin a portion of the surface of these sections.

Figure 5:
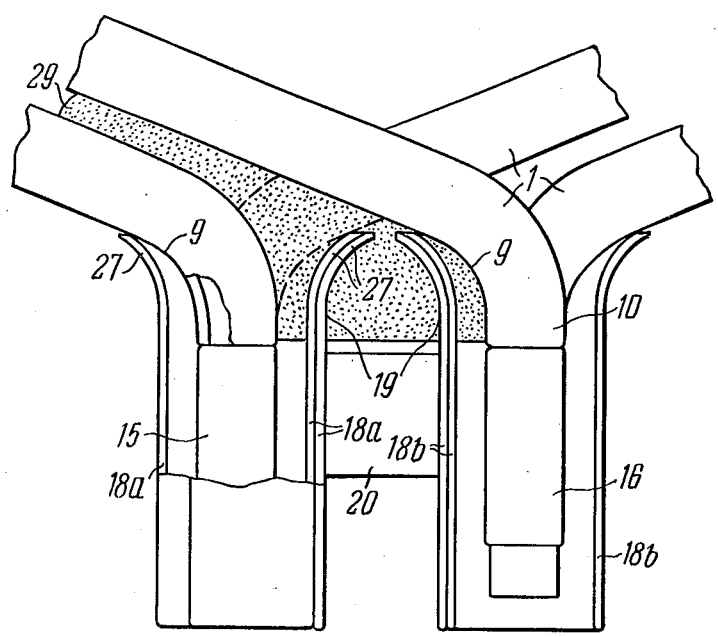
FIG. 5 is a view of two adjacent extreme end connections of the stator winding bars with the box-type dielectric screens installed thereon and shown with cutaways as viewed from the side of the central axis of the electric-machine stator.

The mutual arrangement of the box-type dielectric screens 18, the end portions of the bars 1 and their end connections illustrated in FIG. 5 showing the view, from the side of the central axis of the stator, of two neighbouring extreme end connections 15 and 16 with partial cut-aways of the box-type dielectric screens 18, used to remove the inner walls 25 of the latter. The box-type dielectric screens 18 are so installed that the length of the part of the involute section 9 of the bar 1, that is adjoined by the inner surfaces of the bent parts 27 of the channel-shaped member 21 and the angle-shaped members 22 and 23, as expressed in millimeters, is equal numerically to at least 2.5 $U_r$ where $U_r$ is the rated voltage of the electric machine. If one takes the data of the example given hereinabove where the rated voltage of the generator is equal to 25 kilovolts, then the length of the contacting part of the involute section 9 and the bent parts 27 should be also equal to 62.50 millimeters. Such a length is also sufficient to prevent, in most cases, the flashover of the end connections 15 and 16 with the flow of the flashover current over the contacting surfaces of the basic insulation of the involute section 9 and the bent parts 27. As an additional measure preventing such a flashover, the adjoining sections of the bent parts 27 contacting with the surface of the involute sections 9 may be also sealed with a means that is a layer of putty made from a moulding, thermosetting compound applied to the surface of the basic insulation of the involute sections 9 along the edges of the bent parts 27.

Installed in the interphase region 17 beyond the cleat wedge 17 arranged in the region of the straight-line sections 10 of the end portions of the bars 1 is a tangentially fastening member 29 for these portions. The tangentially fastening member 29 is installed in such a manner that it adjoins a portion of the external surface of the adjacent walls 19 of the box-type dielectric screens 18 and, at the same time, a portion of the basic insulation of the involue sections 9 of the end portions of the bars 1. Therewith, the tangentially fastening member 29 enters the region of the involute sections 9 to a length approximately equal to 5 to 10 percent of the length of this region. The tangentially fastening member 29 is made from a moulding, thermosetting, insulating material that partially penetrates into recesses and pores of the surfaces to which it contacts after it is introduced into the region of installation. After the drying of this material with a surface heating up to a temperature of 50° C. to 60° C. for three to four hours, a bonding known as the mechanical ahdesion is produced between it and the surfaces with which it contacts. This provides a stiff mechanical connection of the end portions of the bars 1 therewith and with the box-type dielectric screens 18.

The channel-shaped members 21 and the angle-shaped members 22 and 23 used to build up the box-type dielectric screens 18 are made from a thermosetting, insulating material incorporating mica and having the dielectric properties essentially similar to those of the basic insulation of the bars 1. Therewith, used as such a material may be a Mycalex tape incorporating 26 to 40 percent of mica and epoxidized-novolac binders or a Mycalex tape incorporating at least 28 percent of mica and epoxidized-polyester compounds as binders. The manufacture of the members 21, 22 and 23 used to build up the box-type dielectric screens 18 from said material having increased mechanical and electrical properties allows the thickness of the walls and flanges of these members to be chosen to be comparatively small, not deteriorating the high-voltage parameters of the insulation of the extreme end connections 15 and 16. This makes it possible, in turn, to easily arrange the box-type dielectric screens 18 in the interphase region 17.

The proposed stator bar winding of an electric machine that is an alternating-current generator having a power of approximately 500 megawatts and a rated voltage of the order of 25 kilovolts can be implemented with the following main geometrical dimensions of the box-type dielectric screens 18:

the length of the box-type screen (along the central axis of the stator) equal to 300 mm;

the width of the box-type screen (in the tangential plane of the stator) equal to 65 mm;

the height of the box-type screen (in the radial plane of the stator) equal to 250 mm;

the length of the bent parts of the members used to build up the box-type screen, equal to 65 mm;

the thickness of the walls and flanges of the members used to build up the box-type screen, equal to 2.5 to 3 mm.

When a current flows through the stator winding during the operation of the electric generator, a high potential difference exists between the most close points of the extreme end connections 15 and 16 (FIG. 1). This potential difference is especially high, when the generator undergoes the high-voltage tests and the extreme end connections alternately experience the action of voltages whose amplitude may exceed the amplitude of the operating voltage of the generator by a factor of 2.5 and over. So, for example, the stator winding of the powerfull generator described hereinabove have been tested by a combined voltage equal to 78 kilovolts and a commercial-frequency voltage of 50 kilovolts; however, no flashover of the extreme end connections 15 and 16 insulated by the box-type dielectric screens 18 has been observed in these tests.

The fact is that the walls 19 and 24 of the box-type dielectric screens 18, arranged in the interphase regions 17 in the raial planes of the stator act as members equalizing the electric fields generated in these regions. In cosequence of this as well as owing to the selection of the suitable material for the members 21, 22 and 23 used to build up the box-type dielectric screens 18 and the selection of the optimal thickness for the walls of the above mentioned members, a high dielectric strength is provided for the entire construction of the insulating arrangement in the tangential directions, and even in those cases where the interphase region 17 is accidentally contaminated with anything during the service of the generator. As a result, the electric breakdown can arise in the interphase region 17 in the tangential directions only at voltages well in excess of the test one.

The inner wall 25 and the outer wall 26 of the box-type dielectric screens 18 act in a similar manner in the radial directions; moreover, in these walls, the chosen value of the overlap of the flanges of the channel-shaped members 21 and the angle-shaped members 22 and 23, that are used to form these walls substantially lengthens the path of the flashover current over their contacting surfaces. The bent parts 27 of the members 21, 22 and 23, adjoining the basic insulation of the involute sections 9 also contribute to the lengthening of the path of the flashover current in the directions lying in the longitudinal planes of the stator, not allowing this current to flow along the shortest path.

All this provides an improvement of the high-voltage parameters of the insulation arrangement of the extreme end connections 15 and 16 of the bars 1, in particular, increases the flashover voltage of these connections.

The selected length of the part of the involute sections 9 that are adjoined by the bent parts 27 of the members 21, 22 and 23, which is numerically equal to 2.5 $U_r$ is, as the performed investigations have shown, the minimum one required, and the voltage required for the flashover over the contacting surfaces of these sections and members is appreciably reduced, as it is decreased. The length of the overlap of the flanges of the channel-shaped members 21 and the angle-shaped members 22 and 23 used to build up the walls 25 and 26 of the box-type screens 18, which is also nemerically equal to 2.5 $U_r$ is the minimal one required as well.

When the electric current flows through the stator winding during the operation of the electric generator with increased loads, the end windings experience the action of rather considerable alternating electrodynamical forces. Therewith, the end connections 11 of the bars 1 as well as their extreme end connections 15 and 16 that are under the maximally unfavourable electric conditions are arranged in the regions of action of the maximal values of the generated electrodynamical forces causing the vibrations of the end windings, that can lead to the failure of the generator, as was mentioned hereinabove. The tangentially fastening members 29 for the end portions of the bars 1, installed in the interphase regions 17 so as to eneter the region of arrangement of their involute sections 9 to a length equal to 5 to 10 percent of the total length of the latter region increases the stiffness of the entire construction of the end windings and, thus, provides an increased resistance of the winding to vibrations. This occurs owing to the arrangement of the tangentially fastening members 29 just in the region of action of the maximal values of the disturbing forces, on one hand, and owing to an increase in the contacting area of these members with the surface of the end portions of the bars 1, on the other. The investigations performed showed that the entrance of the tangentially fastening members 29 to the region of the involute sections 9 to a longer length is inefficient and discontinues to reduce the amplitudes of the vibrations generated.

The electric-machine stator bar winding in accordance with the present invention has the following advantages as compared with the known prior art windings provided with insulation means for the extreme end connections of the bars included into different phase groups of the winding.

First of all, it is necessary to note an increased reliability of the proposed stator bar winding that is caused, on one hand, by a higher resistance of the end windings to vibrations and by improved high-voltage parameters of the insulation arrangement for the extreme end connections of the bars, namely, by the increased flashover voltage of these connections in the interphase regions of the end windings, on the other. In particular, the flashover voltage is increased by at least 30 percent. This reduces the probability of the flashover for the extreme end connections at high voltages occuring during high thunderstorm and switching overvoltages as well as provides the adequate margin to develop a generator with a higher rated voltage, for example, 27 kilovolts or 30 kilovolts.

In the proposed stator bar winding, the construction of the insulating arrangement for the extreme end connections of the bars firstly provides a reliable insulation of these connections also in the events when the end windings are moistened, for example, due to a sharp variation of the ambient temperature or liquid drops get into the interphase regions, for example, due to slight leakages that sometimes occur in the winding water-cooling system; secondly, it allows this arrangement to be used without any complication of the configuration of the end portions of the extreme winding bars in the end windings and makes it possible to modernize already working electric machines without any significant changes in the end windings; and thirdly this facilitates the assemblying of said arrangement.

Furthermore, the proposed stator bar winding with the insulating arrangement described hereinabove and used for the extreme end connections allows the total length of the electric machine to be reduced almost by 2 percent as the calculations show. This gives an appreciable saving of copper, structural and insulating materials as well as special electric sheet steel.

All this as a whole makes it possible to simplify the manufacturing process of the electric machine, to reduce the time of its manufacturing and, thus, to decrease the cost of the electric machine and the expenditures for building the power station where this electric machine will be installed.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the appended claims.

What is claimed is:

1. An electric-machine stator bar winding whose bar end portions have involute and straight-line sections and which comprises in the end windings:
   an arrangement for electrical insulation of end connections of extreme bars included in different phase groups of said bar winding,
   said end connections being separated from one another by interphase regions,
   said arrangement for the electrical insulation comprising a plurality of box-type dielectric screens encompassing each one of said end connections,
   said box-type dielectric screens being installed in pairs in such a manner that, in each of said interphase regions, said box-type dielectric screens have adjacent walls lying in the radial planes of the electric-machine stator,
   each of said box-type dielectric screens being built up by angle-shaped and channel-shaped members made from an electrically insulating thermosetting material,
   said angle-shaped and channel-shaped members being installed in such a manner that each of said adjacent walls of each of said pairs of said box-type dielectric screens is formed by adjoining walls of said angle-shaped members, wherein a wall of each of said box-type dielectric screens, lying in the radial plane of said electric-machine stator, but lying opposite to said adjacent walls, is formed by the wall of said channel-shaped member, whereas an inner wall and an outer wall of each of said box-type dielectric screens lie in the tangential planes of said electric-machine stator, and each of said walls is formed by one flange of said channel-shaped member and a flange of said angle-shaped members adjoining each other with an overlap,
   each of said angle-shaped and channel-shaped members having bent end parts,
   said bent end parts of said angle-shaped and channel-shaped members extending along said involute sections of said extreme bars and adjoining the surface thereof, and
   a plurality of members for tangential fastening of said end portions of said bars,
   each of said tangentially fastening members being made from an electrically insulating moulding material,
   each of said tangentially fastening members adjoining a portion of the surface of said adjacent walls of said box-type dielectric screens in said pairs thereof and a portion of the surface of involute sections of said end portions of the extreme bars of said winding.

2. An electric-machine stator bar winding as defined in claim 1, wherein the total length of overlap of said flanges of said channel-shaped and angle-shaped members of said inner or outer walls of each of said box-type dielectric screens, and the length of said portion of each of said involute section of said extreme bar that is adjoined by said bent part of said channel-shaped and angle-shaped members, expressed in millimeters, are numerically equal to at least 2.5 $U_r$, where $U_r$ is the rated voltage of the electric machine, expressed in kilovolts.

3. An electric-machine stator bar winding as defined in claim 1, wherein said tangentially fastening members enter said region of said involute sections of said end portions of said extreme bars to a length equal to 5 to 10 percent of the length of this region.

4. An electric-machine stator bar winding as defined in claim 2, wherein said tangentially fastening members enter said region of said involute sections of said end portions of said extreme bars to a length equal to 5 to 10 percent of the length of this region.

5. An electric-machine stator bar winding as defined in claim 1, further comprising sealing and means for sealing said overlapping sections of said flanges of said channel-shaped and angle-shaped members of said box-type dielectric screens, said sealing means comprising a layer of a moulding, setting, thermosetting compound applied to the surface of said inner and outer walls of said box-type dielectric screens and to edges of said flanges.

6. An electric-machine stator bar winding as defined in claim 3, further comprising sealing means for sealing said overlapping sections of said flanges of said channel-shaped and angle-shaped members of said box-type dielectric screens, said sealing means comprising a layer of a moulding, setting, thermosetting compound applied to the surface of said inner and outer walls of said box-type dielectric screens and to edges of said flanges.

7. An electric-machine stator bar winding as defined in claim 4, further comprising sealing means for sealing said overlapping sections of said flanges of said channel-shaped and angle-shaped members of said box-type dielectric screens, said sealing means comprising a layer of a moulding, setting, thermosetting compound applied to the surface of said inner and outer walls of said box-type dielectric screens and to edges of said flanges.

8. An electric-machine stator bar winding as defined in claim 1, wherein said channel-shaped and angle-shaped members used to build up said box-type dielectric screens are made from a thermosetting material incorporating mica and having dielectric properties essentially similar to the dielectric properties of the basic insulation of said bars of said winding.

9. An electric-machine stator bar winding as defined in claim 6, wherein said channel-shaped and angle-shaped members used to build up said box-type dielectric screens are made from a thermosetting material incorporating mica and having dielectric properties essentially similar to the dielectric properties of the basic insulation of said bars of said winding.

10. An electric-machine stator bar winding as defined in claim 7, wherein said channel-shaped and angle-shaped members used to build up said box-type dielectric screens are made from a thermosetting material incorporating mica and having dielectric properties essentially similar to the dielectric properties of the basic insulation of said bars of said winding.

11. An electric-machine stator bar winding as defined in claim 8, wherein said channel-shaped and angle-shaped members used to build up said box-type dielectric screens are made from mica impregnated electrical insulating tape incorporating 26 to 40 percent of mica with the use of epoxidized-novolac binders.

12. An electric-machine stator bar winding as defined in claim 8, wherein said channel-shaped and angle-shaped members used to build up said box-type dielectric screens are made from mica impregnated electrical insulating tape incorporating at least 28 percent of mica with the use of epoxidized-polyester compounds as binders.

13. An electric-machine stator bar winding as defined in claim 9, wherein said channel-shaped and angle-shaped members used to build up said box-type dielectric screens are made from mica impregnated electrical insulating tape incorporating 26 to 40 percent of mica with the use of epoxidized-novolac binders.

14. An electric-machine stator bar winding as defined in claim 9, wherein said channel-shaped and angle-shaped members used to build up said box-type dielectric screens are made from mica impregnated electrical insulating tape incorporating at least 28 percent of mica with the use of epoxidized-polyester compounds as binders.

15. An electric-machine stator bar winding as defined in claim 10, wherein said channel-shaped and angle-shaped members used to build up said box-type dielectric screens are made from mica impregnated electrical insulating tape incorporating 26 to 40 percent of mica with the use of epoxidized-novolac binders.

16. An electric-machine stator bar winding as defined in claim 10, wherein said channel-shaped and angle-shaped members used to build up said box-type dielectric screens are made from mica impregnated electrical insulating tape incorporating at least 28 percent of mica with the use of epoxidized polyester compounds as binders.

* * * * *